United States Patent [19]
Chung

[11] Patent Number: 5,680,759
[45] Date of Patent: Oct. 28, 1997

[54] STRAIGHT TRAVELLING APPARATUS FOR HEAVY CONSTRUCTION EQUIPMENT

[75] Inventor: Dae Seung Chung, Pusan, Rep. of Korea

[73] Assignee: Samsung Heavy Industries Co., Ltd., Seoul, Rep. of Korea

[21] Appl. No.: 497,325

[22] Filed: Jun. 30, 1995

[30] Foreign Application Priority Data

Dec. 28, 1994 [KR] Rep. of Korea ............... 94-38018

[51] Int. Cl.$^6$ ............................................. F16D 31/02
[52] U.S. Cl. ................... 60/421; 60/422; 60/494; 91/513; 91/531
[58] Field of Search ............... 60/486, 494, 421, 60/422; 91/513, 531

[56] References Cited

U.S. PATENT DOCUMENTS

| | | | |
|---|---|---|---|
| 3,960,284 | 6/1976 | Carpenter | 60/421 X |
| 4,024,710 | 5/1977 | Zelle | 60/422 X |
| 4,030,623 | 6/1977 | Bridwell et al. | 60/421 X |
| 4,112,821 | 9/1978 | Bianchetta | 60/486 X |
| 4,210,061 | 7/1980 | Bianchetta | 91/531 X |
| 4,561,824 | 12/1985 | Okabe et al. | 91/531 X |
| 4,768,339 | 9/1988 | Aoyagi et al. | 91/513 X |
| 5,101,627 | 4/1992 | Fujii et al. | 60/486 X |

*Primary Examiner*—F. Daniel Lopez
*Attorney, Agent, or Firm*—Kenyon & Kenyon

[57] ABSTRACT

A straight travelling apparatus for heavy construction equipment, equipped with a travel supplement circuit, including a variable orifice disposed in a fluid line connected to the supply-side of the control valve of a bucket and controlled to vary an opening degree thereof by a predetermined pilot signal that is applied to the variable orifice in response to an operation of at least one of right and left travel motors in order to keep the variable orifice at a relatively closed state while being released in response to the travel motors not operating in order to keep the variable orifice in a relatively opened state, thereby capable of supplementing a sufficient amount of fluid to a travelling system when the bucket is operated during, thereby preventing an abrupt reduction in travelling speed caused by operatings the straight travelling apparatus.

2 Claims, 3 Drawing Sheets

STRAIGHT TRAVELLING APPARATUS FOR HEAVY CONSTRUCTION EQUIPMENT

BACKGROUND OF THE INVENTION

1. Field of the Invention

The present invention relates to a straight travelling apparatus for heavy construction equipment, and more particularly to such an apparatus capable of continuously maintaining the straight travelling function of moving construction equipment such as excavators or cranes even when a working unit of the construction equipment is operated during the movement of the construction equipment.

2. Description of the Prior Art

Generally, travelling construction equipment such as excavators and cranes are constructed to operate actuators (travel motors) of its travelling system and actuators (boom cylinder, arm cylinder, bucket cylinder and the like) of its working system using a flow of fluid delivered from a single pump.

Such a construction is illustrated in FIG. 1. As shown in the drawing, a first hydraulic pump P1 and a second hydraulic pump P2 both having the same displacement are provided to be driven by a single engine. The first hydraulic pump P1 serves to supply operating fluid for the right travel motor TR and actuators of working system; including a boom cylinder BOOM, an accessary unit ACC and a bucket cylinder BKT whereas the second hydraulic pump P2 serves to supply operating fluid for a left travel motor TL and other actuators of the working system including a swing motor SW and an arm cylinder ARM.

Although the reference symbols TR and TL in FIG. 1 have been shown as respectively denoting the right travel motor-side control valve and the left travel motor-side control valve, they will be described as respectively corresponding to the right travel motor and the left travel motor in the following description for convenience. For the same purpose, the reference symbols BOOM, ACC, BKT, SW and ARM will be described as respectively corresponding to the actuators of working system in the following description, even though they have been shown as respectively denoting control valves of the actuators of the working system.

As the right and left travel motors TR and TL are driven after an activation of the engine in the conventional construction equipment having the above-mentioned construction, a flow of fluid delivered from the first hydraulic pump P1 is fed to the right travel motor TR via a fluid line connected between the first hydraulic pump P1 and the right travel motor TR while a flow of fluid delivered from the second hydraulic pump P2 is fed to the left travel motor TL via a fluid line connected between the second hydraulic pump P2 and the left travel motor TL. Accordingly, the construction equipment can travel straight because the first and second hydraulic pump P1 and P2 have the same displacement.

When at least one of the actuators of the working system is actuated under the condition that the construction equipment travels straight, for example, when the arm cylinder ARM is supplied with the operating fluid to actuate an arm, the fluid flow delivered from the second hydraulic pump P2 is distributively fed to both the left travel motor TL and the arm cylinder ARM via parallel fluid lines. As a result, the amount of fluid supplied to the left travel motor TL becomes less than the amount of fluid supplied to the fight travel motor TR. This results in a failure to keep the construction equipment travelling straight and thereby creating a left declination of the construction equipment.

Therefore, it is absolutely needed to provide a straight travelling device for avoiding unexpected declination of the construction equipment and keeping the straight travelling of the construction equipment even when a single working unit is operated during movement travel of the construction equipment. As such a straight travelling device, conventional travelling construction equipment includes a valve 10 for straight travel (this valve will be referred to as a straight travel valve). This straight travel valve 10 serves to allow the first and second hydraulic pumps P1 and P2 to Independently supply their operating fluids to the fight and left travel motors TR and TL under a condition that the working unit does not operate during the travelling of the construction equipment. It can be performed by the spool of the straight valve 10 moving to the right, so that the delivery from pump P1 and P2 is supplied to the right travel motor TR and the left travel motor TL independently. When the working unit operates during the movement of the construction equipment, the straight travel valve 10 serves to allow a selected one of the first and second hydraulic pumps P1 and P2 (in the illustrated case, the first hydraulic pump P1) to supply its operating fluid to both the right and left travel motors TR and TL and to allow the other hydraulic pump P2 to supply its operating fluid to the working unit being operated. It can be performed by the spool of the straight valve 10 moving to the left, so that the delivery from pump P1 is supplied to both of the right travel motor TR and the left travel motor TL and the delivery from pump P2 is supplied to the other operating actuator. As a result, the right and left travel motors TR and TL always receive the same amount of fluid irrespective of whether or not a working unit is being operated, thereby achieving the desired straight travelling function.

However, such a conventional straight travelling device is inefficient in terms of the fluid flow distribution because during the straight travelling operation, the first hydraulic pump P1 serves to supply its operating fluid to both the right and left travel motors TR and TL while the second hydraulic pump P2 serves to supply its operating fluid to a selected actuator of the working unit to be operated. In other words, there is a problem that although the straight travelling of the construction equipment is kept, the travelling speed is reduced by half because the fluid delivered from the first hydraulic pump P1 is equally distributed to the right and left travel motors TR and TL. Actually, this problem means that the construction equipment which has travelled at a given speed of, for example, 40 Km/h can not help travelling at a speed reduced to 20 Km/h when its working unit operates. Where the working unit being operated is the bucket, the inefficiency of the fluid flow distribution becomes more severe. This is because the travel motors TR and TL receive halves of the delivery of the first hydraulic pump P1 respectively whereas the bucket receives a relatively excessive fluid amount, that is, the entire fluid amount delivered from the second hydraulic pump P2.

In order to solve this problem, use of a travel supplement circuit or travel assistant circuit has been proposed. Such a travel supplement circuit is illustrated in FIG. 2. As shown in FIG. 2, the travel supplement circuit includes a connecting fluid line 25 for connecting a travelling system fluid line 21 communicating with the straight travel valve 10a to a working system fluid line 23, and a check valve 27 disposed in the connecting fluid line 25.

During the straight travelling operation of the construction equipment, accordingly, a part of the delivery of the first hydraulic pump P1 is fed to a selected actuator of the working unit being operated while the remaining part of the delivery of the first hydraulic pump P1 is fed to the travelling system fluid line 21 through the connecting fluid line 25 and the check valve 27 and then to the travel motors TR and TL. As a result, the shortage of fluid at the side of the travelling system is supplemented. Thus, a rational fluid distribution is achieved.

Where there is only one unit being operated, such as the bucket, requiring a relatively small fluid amount, however, most of the fluid flow delivered from the second hydraulic pump P2 is fed to the bucket having a very small load because of the tendency that a fluid flows toward a smaller load. As a result, the travelling motors receive little part of the fluid flow delivered from the second hydraulic pump P2 in spite of the provision of the travel supplement circuit. Consequently, the conventional travel supplement circuit achieves its function insufficiently.

SUMMARY OF THE INVENTION

Therefore, an object of the invention is to provide a straight travelling apparatus for heavy construction equipment, capable of supplementing a sufficient amount of fluid to the travelling system when the bucket is operated during operation of the travelling system, thereby preventing an abrupt reduction in travelling speed caused by an operation of the straight travelling apparatus and more effectively achieving a straight travelling function.

In accordance with the present invention, this object is accomplished by providing a straight travelling apparatus for heavy construction equipment, equipped with a travel supplement circuit, comprising: a variable orifice disposed in a fluid line connected to a supply-side of a control valve of a bucket and controlled to vary an opening degree thereof by a predetermined pilot signal that is applied to the variable orifice in response to an operation of at least one of right and left travel motors in order to keep the variable orifice at a relatively closed state while being released in response to no operation of the travel motors in order to keep the variable orifice at a relatively opened state.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
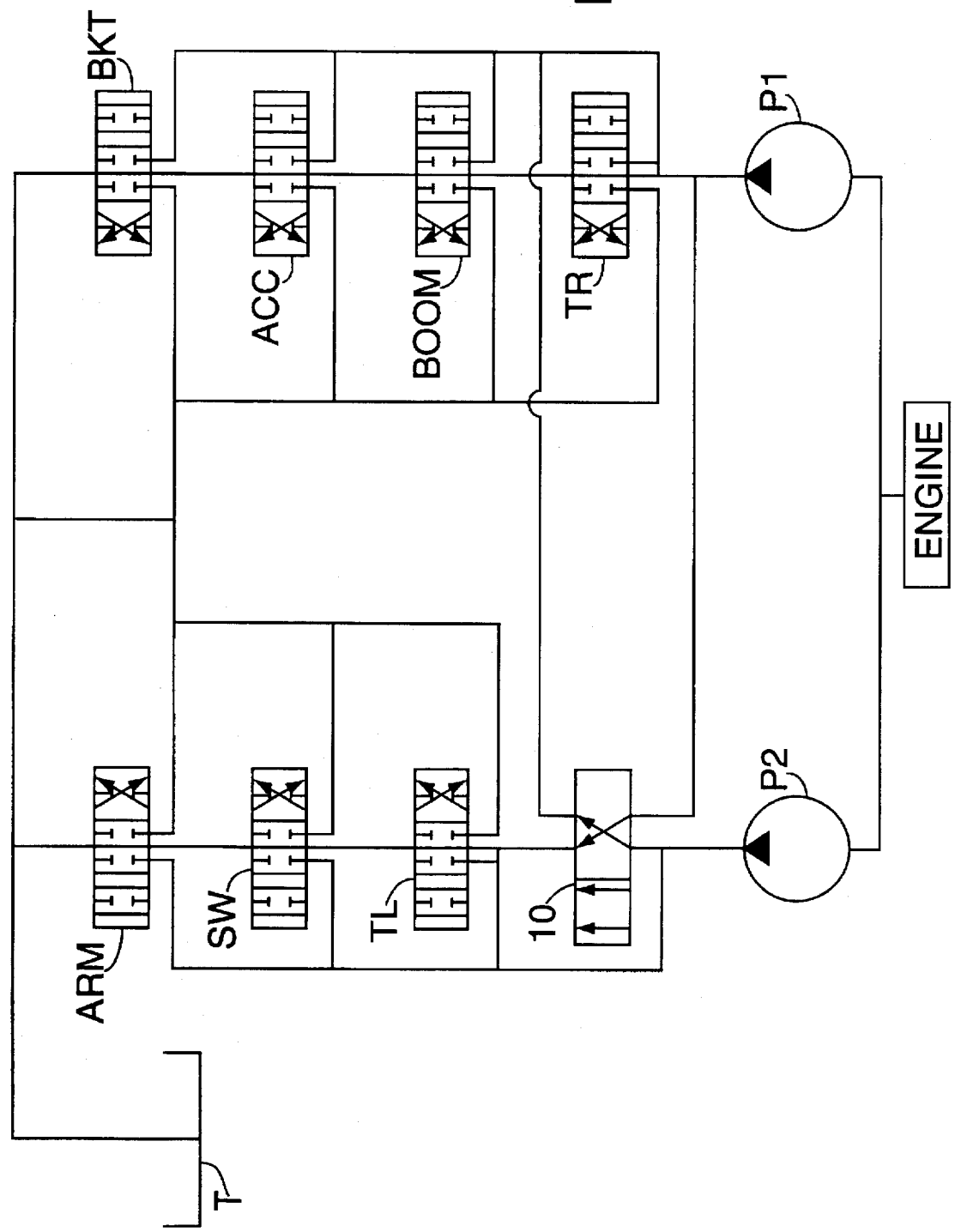
FIG. 1 is a circuit diagram of a hydraulic circuit for heavy construction equipment equipped with a conventional straight travelling device.
Figure 2:
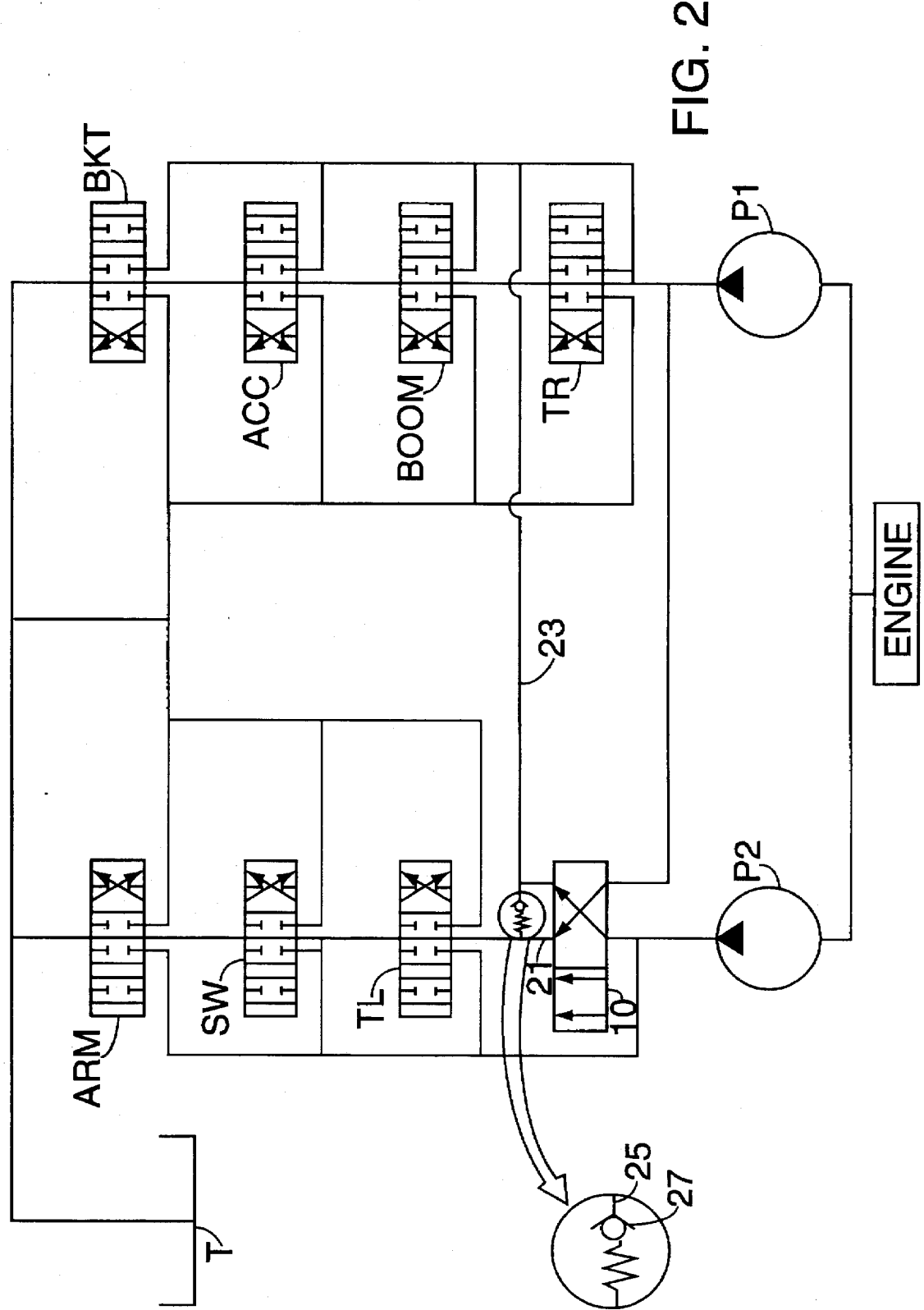
FIG. 2 is a circuit diagram of a hydraulic circuit for heavy construction equipment equipped with a conventional straight travelling device having a travel supplement circuit.
Figure 3:
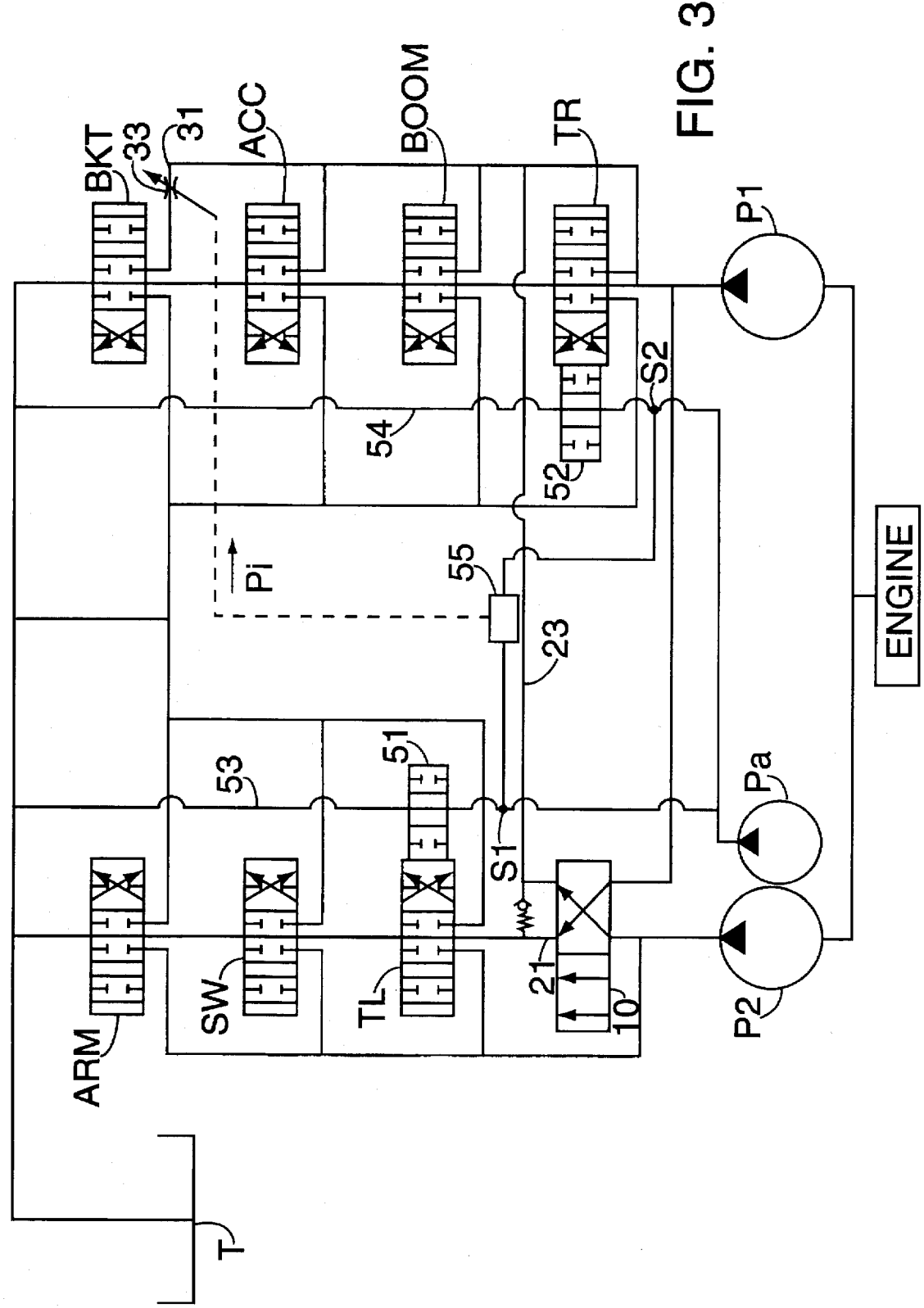
FIG. 3 is a circuit diagram of a hydraulic circuit for heavy construction equipment equipped with a straight travelling apparatus in accordance with an embodiment of the present invention.

Referring to FIG. 3, there is schematically shown a hydraulic circuit for heavy construction equipment to which a straight travelling apparatus in accordance with an embodiment of the present invention is applied. In the following description relating to this embodiment, the basic construction of the hydraulic circuit shown in FIG. 3 and the operation thereof will be omitted because they have been described in conjunction with FIGS. 1 and 2. In FIG. 3, constituting elements respectively corresponding to those in FIGS. 1 and 2 are denoted by the same reference numerals.

As shown in FIG. 3, a first hydraulic pump P1 and a second hydraulic pump P2 both having the same displacement are provided to be driven by a single engine. The first hydraulic pump P1 serves to supply operating fluid for the right travel motor TR and actuators BOOM, ACC and BKT of the working system whereas the second hydraulic pump P2 serves to supply operating fluid for the left travel motor TL and other actuators SW and ARM of the working system.

A straight travel valve 10 is provided at the hydraulic circuit of the construction equipment. This straight travel valve 10 serves to allow the first and second hydraulic pumps P1 and P2 to independently supply their operating fluids to the right and left travel motors TR and TL under a condition that the working unit of the construction equipment does not operate during the movement of the construction equipment. When the working unit operates during the movement of the construction equipment, the straight travel valve 10 serves to allow a selected one of the first and second hydraulic pumps P1 and P2 (in the illustrated case, the first hydraulic pump P1) to supply its operating fluid to both the right and left travel motors TR and TL and to allow the other hydraulic pump P2 to supply its operating fluid to the working unit being operated.

A connecting fluid line 25 is also provided to connect a travelling system fluid line 21 communicating with the straight travel valve 10 to a working system fluid line 23. A check valve 27 is disposed in the connecting fluid line 25. The connecting fluid line 25 and the check valve constitute a travel supplement circuit. During the straight travelling operation of the construction equipment, accordingly, a part of the fluid flow delivered from the first hydraulic pump P1 is fed to a selected actuator of the working unit being operated while the remaining part of the fluid flow delivered from the first hydraulic pump P1 is fed to the travelling system fluid line 21 through the connecting fluid line 25 and the check valve 27 and then to the travel motors TR and TL.

A variable orifice 33 is disposed in a fluid line 31 connected to the supply-side of a control valve of the bucket BKT. The opening degree of the variable orifice 33 is controlled by a given pilot signal Pi.

The pilot signal Pi is generated upon operating the right travel motor TR and/or left travel motor TL and applied to the variable orifice 33. By this pilot signal Pi, the variable orifice 33 varies its opening degree so that it is at a relatively closed state having an opening degree smaller than a fully opening degree. The application of the pilot signal Pi to the variable orifice 33 is released as the right travel motor TR and/or the left travel motor TL does not operate. By the release of the pilot signal Pi, the variable orifice 33 is at its fully opened state.

In order to apply or release the pilot signal Pi, depending on whether or not the travel motors TR and TL operate, it is required to detect whether or not the travel motors TR and TL are operating. This may be achieved by means shown in FIG. 3. In FIG. 3 two auxiliary valves 51 ND 52 are directly coupled to control valves TR and TL for travel motors respectively. The internal lines of auxiliary valves are opened or become orifices in accordance with the positions of the spools for the their associated control valves TR and TL. Two fluid lines 53 and 54 extending from a hydraulic pump $P_a$ to a return tank T passes the auxiliary valves 51 and 52 respectively. The internal line of the auxiliary valve is designed in such a manner that the internal line becomes an orifice when the spool of its associated control valve is in the neutral position, but is opened when the spool of the associated valve is moved. In order to detect fluid pressure P1 and P2 at points "S1" and "S2" before the auxiliary valves 51 and 52, two pressure detecting means are provided at the two points "S1" and "S2". A controlling means 55 is also provided. When both of two pressure P1 and P2 are positive, that is, both of two travel motors are operated, the controlling means 55 generates pilot signal Pi, whereby the variable orifice 33 varies its opening degree so that it is at a relatively closed state.

This may be achieved also by using a method of detecting variations in pressure of the fluid lines connected to assistant valves arranged in a series and respectively provided with inner fluid passages directly connected to control valves of travel motors such that they are opened and shut off depending on movements of spool of the control valves.

In this connection, Korean Patent Application No. 94-28043 "Apparatus for Sensing Actuating Signal for Actuator" filed on Oct. 29, 1994 in the name of the applicant discloses in detail a technique for sensing whether or not a variety of hydraulic actuators including travel motors operate. In particular, there is also disclosed a technique for sensing whether or not at least two actuators operate simultaneously or whether or not one of them operates alone.

In the illustrated embodiment, it is more desirable to sense whether or not both the right travel motor TR and the left travel motor TL are operating simultaneously, so as to achieve an appropriate control for the variable orifice 33 at the side of the bucket. Using the technique disclosed in the Korean Patent Application No. 94-28043, this sensing function can be easily realized.

Operation of the straight travelling apparatus having the above-mentioned arrangement in accordance with the embodiment of the present invention will now be described.

Where the bucket BKT operates under a condition that neither of the right and left travel motors TR and TL operates, the variable orifice 33 is at its fully opened state because no pilot signal is applied to the variable orifice 33. At this state, there is no loss of pressure through the orifice 33. Accordingly, the bucket BKT is supplied with a sufficient mount of fluid for its work from the first hydraulic pump P1.

When the bucket BKT operates under a condition that the right and left travel motors TR and TL operate, a flow of fluid delivered from the first hydraulic pump P1 is fed to both the right and left travel motors TR and TL whereas a flow of fluid delivered from the second hydraulic pump P2 is fed to the bucket BKT. At this time, a part of the fluid flow delivered from the second hydraulic pump P2 being supplied to the bucket BKT via the working system fluid line 23 is fed to the travelling system fluid line 21 by the travel supplement circuit constituted by the connecting fluid line 25 and the check valve 27 and then to both the travel motors TR and TL. At this time, a pilot signal Pi is also generated because the travel motors TR and TL are operating. By this prior signal Pi, the variable orifice 33 varies its opening degree so that it is at a relatively closed state. As a result, the orifice 33 generates an increase in load to limit the amount of fluid supplied to the side of the bucket BKT. Therefore, the amount of fluid supplementarily supplied to the travel motors TR and TL is increased in proportion to the limited fluid amount.

As apparent from the above description, the present invention provides a straight travelling apparatus for heavy construction equipment, capable of supplementing a sufficient amount of fluid to a travelling system when the bucket is operated during a travelling operation of the travelling system, thereby preventing an abrupt reduction in travelling speed caused by the operation of the straight travelling apparatus and more effectively achieving a straight travelling function.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A straight travelling apparatus for a construction equipment which includes an engine; a first hydraulic pump and a second hydraulic pump driven by said engine; a plurality of actuators for a travelling system including a left travel motor and a right travel motor and a working system, said actuators being supplied with fluids by said first and second pumps; and a straight travelling device, said straight travelling device serving to allow said first and second pump to independently supply fluids for said left and right travel motor when a working unit does not operate during travelling of said construction equipment and serving to allow said first pump to supply its operating fluid for both said left and right travel motors through a travelling system fluid line and to allow said second pump to supply its operating fluid for a working unit operated through a working system fluid line when a working unit operates during travelling of said construction equipment, comprising:

(a) a connecting fluid line, said connecting fluid line connecting said travelling system fluid line to said working system fluid line;

(b) a check valve disposed in said connecting fluid line, said check valve serving to supplement a shortage of fluid at said travel motors when a working unit operates during travelling of said construction equipment; and (c) a variable orifice disposed in a fluid line connected a supply-side of control valve for a bucket, said variable orifice being controlled to vary its opening degree by a predetermined pilot signal applied to said variable orifice in response to operation of both of said travel motors in order to keep said variable orifice in a relatively closed state while being released when both of said travel motors do not operate in order to keep said variable orifices in a relatively opened state.

2. The straight travelling apparatus in accordance with claim 1, wherein the pilot signal is applied to the variable orifice only when both the right and left travel motors are operating.

* * * * *